April 15, 1969 G. ROSCHER ET AL 3,438,870
PROCESS FOR THE CONTINUOUS RECOVERY OF VINYL ESTERS AND
CARBOXYLIC ACIDS BY AZEOTROPIC DISTILLATION
Filed Dec. 19, 1967
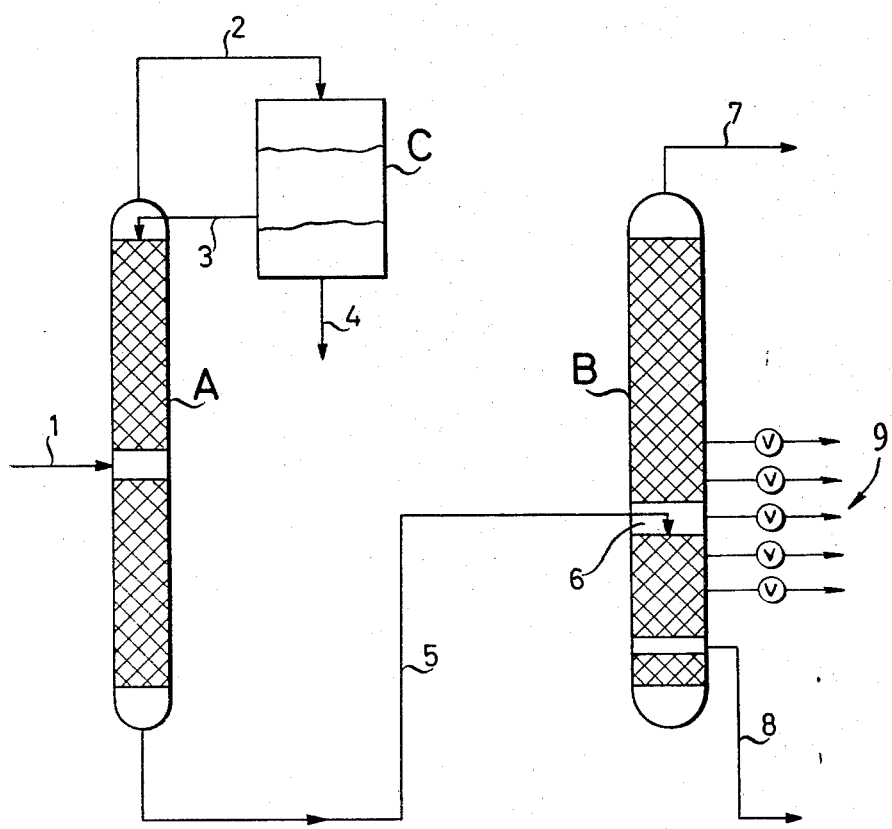
INVENTORS
GÜNTER ROSCHER
KLAUS GÜNTHER
OTTO PROBST
JÖRG SCHOLDERER
BY *Curtis, Morris & Safford*
ATTORNEYS United States Patent Office 3,438,870
Patented Apr. 15, 1969

3,438,870
PROCESS FOR THE CONTINUOUS RECOVERY OF VINYL ESTERS AND CARBOXYLIC ACIDS BY AZEOTROPIC DISTILLATION
Günter Roscher, Kelkheim, Taunus, and Klaus Günther, Otto Probst, and Jorg Scholderer, Frankfurt am Main, Germany, assignors to Farbwerke Hoechst Aktiengesellschaft vormals Meister Lucius & Bruning, Frankfurt am Main, Germany, a corporation of Germany
Filed Dec. 19, 1967, Ser. No. 691,747
Claims priority, application Germany, Jan. 12, 1967, F 51,238
Int. Cl. B01d 3/34, 3/10
U.S. Cl. 203—60                                                     8 Claims

ABSTRACT OF THE DISCLOSURE

The invention provides a process for the continuous recovery of vinyl esters and carboxylic acids from crude mixtures obtained by vinylation of carboxylic acids with ethylene and oxygen and consisting of the vinyl ester, unreacted carboxylic acid, water and other by-products. The mixture is separated in two subsequent distilling columns in which in the first column the water and part of the by-products are separated and in the second column the remaining mixture is separated into the vinyl ester, the carboxylic acid and the rest of the by-products.

---

The present invention relates to a process for the continuous recovery of vinyl esters and carboxylic acids from crude mixtures obtained in the vinylation of carboxylic acids with ethylene and oxygen.

In the production of vinyl esters from ethylene, oxygen and carboxylic acids liquid crude mixtures are obtained the composition of which is different from that of crude mixtures obtained in the production of vinyl esters from acetylene and carboxylic acids. In the acetylene process mainly acetaldehyde, crotonic aldehyde and the respective carboxylic anhydride are formed as by-products in addition to the vinyl esters, whereas in the ethylene process the by-products are the ethyl ester of the respective carboxylic acid, acetaldehyde and water of reaction. In the formation of the vinyl ester the water of reaction is obtained in stoichiometric amounts and additionally it is formed in the oxidation of ethylene to carbon dioxide and water occurring as secondary reaction. It is difficult to isolate the vinyl ester and recover the unreacted carboxylic acid. A vinyl ester intended for polymerization may at most contain traces of secondary constituents and the recovered carboxylic acid to be used again in the vinylation should be pure or contain impurities in as low a concentration as possible so that a reduction of the activity of the vinylation catalysts by these impurities is substantially or totally avoided.

The present invention provides a process for the continuous recovery of vinyl esters and carboxylic acids from crude mixtures originating from the vinylation of carboxylic acids with ethylene and oxygen, which mixtures contain the vinyl ester, unreacted carboxylic acid, water and possibly other by-products, which comprises distilling the crude mixture in a first distilling column in the presence of a substance forming an azeotrope with water and separating the azeotrope and the by-products having a lower boiling point than the vinyl ester at the head of the said column, withdrawing from the sump of the column a practically anhydrous mixture, distilling said mixture in a second distilling column, withdrawing from the second column at the head the vinyl ester, from one or several concentrating zones between the head and sump at least the major part of the by-products having a higher boiling point than the vinyl ester and below the lowest concentrating zone or from the sump the carboxylic acid and the rest of the by-products if any.

The process according to the invention is simple to carry out and economical and permits the saving of distillation energy. It can be used not only to work up crude mixtures obtained in the manufacture of vinyl acetate from oxygen, ethylene and acetic acid but also to work up crude mixtures originating from the manufacture of vinyl esters from oxygen, ethylene and higher carboxylic acids, especially aliphatic monocarboxylic acids such as propionic acid, n- and iso-butyric acids and the various valeric acids. The process of the invention is especially suitable for working up mixtures obtained by reacting the specified compounds in the gaseous phase and in the presence of catalysts containing noble metals or salts or oxides thereof. A fundamental advantage of the process of the invention resides in the fact that it permits obtaining vinyl esters and carboxylic acids in a purity of over 99%.

As substance forming an azeotrope with water in the first distilling column there can be used all liquids and possibly liquid mixtures which do not react chemically under the reaction conditions with the vinyl ester and the carboxylic acid and form with water an azeotrope the boiling point of which is below that of the vinyl ester to be recovered, for example low boiling esters, alcohols or hydrocarbons. According to an especially favorable variant of the process of the invention a foreign substance forming an azeotrope with water is not added, but the vinyl ester contained in the mixture is used to form the azeotrope. The distillate leaving the first distilling column at the head separates into an aqueous phase and an organic phase substantially consisting of the vinyl ester. The vinyl ester is recycled into the column, if necessary after separating organic by-products which have a boiling point below that of the vinyl ester or which form azeotropes having a boiling point below that of the vinyl ester. Owing to the physical solubility the withdrawn aqueous phase still contains generally small amounts of vinyl esters, carboxylic acid, acetaldehyde and possibly components having a boiling point below that of the vinyl ester, for example methyl acetate. It is possible, of course, to separate the small amounts of vinyl ester in a small distilling column from the water and to recycle it.

The acetaldehyde formed in the distillation from the vinyl ester and water may advantageously be collected at the head of the column in gaseous form by adjusting the temperature of the cooling water for the condenser. It may then be liquified by condensation and is thus obtained in pure form. When it is condensed together with the substances mentioned above, it comes into the aqueous phase owing to its good solubility in water and can be recovered from the water after separation of the phases. The special separation of acetaldehyde is only important when mixtures containing vinyl acetate are worked up, because in this case larger amounts are formed owing to the fact that vinyl acetate readily undergoes hydrolysis.

The mixture withdrawn from the sump of the first distilling column is practically free from water and aldehyde. It contains, besides a small proportion of polymers of the vinyl ester, the unreacted portions of the carboxylic acid and by-products the boiling point of which is above that of the vinyl ester, especially the ethyl ester corresponding to the vinyl ester and formed by addition of the carboxylic acid on ethylene. This mixture is transferred into a second distilling column where it is separated by distillation. At the head of the second column the pure vinyl ester distills off. The by-products having a boiling point above that of the vinyl ester, especially the ethyl ester, concentrate in the column in a narrow zone below the inlet of the mixture to be separated and can be withdrawn from that part of the column either continuously or discontinuously through one or several points of discharge. Still further down in the column, preferably above the sump, the carboxylic acid is withdrawn in gaseous form. The sump of the column contains the polymers.

The first distilling column is preferably operated at atmospheric pressure. It is likewise possible, however, to apply reduced pressures, for example down to 100 mm. of mercury. Alternatively, elevated pressure may be applied, for example up to 3 atmospheres gauge. The second distilling column is advantageously also operated at atmospheric pressure, but reduced pressures, for example down to 200 mm. of mercury being also possible. The operating temperatures are, of course, not critical and depend on the boiling points or differences in the boiling points of the mixtures to be separated.

It is surprising that the process of the invention can be universally used for separating vinyl ester/water/carboxylic acid/crude mixtures obtained in the manufacture of most different vinyl esters. It could not be expected that the acetaldehyde formed by hydrolysis of vinyl acetate in the distillation in the presence of water does not trouble the azeotropic elimination of water. Another advantage of the process of the invention is that the hydrolized proportion of vinyl esters of higher carboxylic acids is very low, for example with isobutyric acid or trimethyl acetic acid vinyl ester, in most cases in the range of about 0.1%. The higher carboxylic acids which are soluble in water to a limited extent only form azeotropic mixtures with water boiling at a temperature below 100° C.

As the vinyl esters of the higher carboxylic acids also form with water azeotropes having a similar boiling point it should be expected that in the process of the invention using mixtures with vinyl esters of higher carboxylic acids, the carboxylic acid would come into the distillate of the first column and concentrate in the aqueous phase. With mixtures consisting of vinyl acetate, acetic acid and water the boiling point of the azeotrope vinyl acetate/water is, however, so remote from the boiling point of the acetic acid which does not form an azeotrope with water that practically no acetic acid comes into the distillate. When mixtures are concerned containing, for example, isobutyric acid or trimethyl acetic acid about 1% of the carboxylic acid gets into the distillate of the first column owing to the vicinity of the boiling points of the azeotropic mixtures of acid/water and vinyl ester/water. Whereas in the distribution of acetic acid between the vinyl acetate phase and the water phase the acid is preferably dissolved in the aqueous phase, the higher carboxylic acids preferably concentrate in the vinyl ester. This unexpected distribution improves the economy of the process when carried out on an industrial scale.

The process of the invention offers the further advantage that especially when vinyl acetate is to be recovered, crude mixtures can be used obtained in a vinylation reaction carried out with crude acetic acid instead of commercially pure acid, for example acetic acid obtained in the oxidation of acetaldehyde without subsequent purification of the acid obtained. A crude acetic acid of this type still contains about 2% of water, 2 to 3% of acetaldehyde and about 2% of low boiling esters, for example methyl acetate and methyl formate, which are then present in the liquefied crude mixtures obtained after the vinylation reaction and to be worked up according to the invention.

In this case the methyl acetate is partially used as entrainer for the water to be eliminated in the first distilling column and at the head of the said column a ternary mixture is obtained according to the methyl acetate concentration and consisting of vinyl acetate, methyl acetate and water. The solubility of the methyl acetate in water is so high (about 24%) that when the phases are separated practically the entire amount of methyl acetate is removed with the aqueous phase.

Some of the higher carboxylic acids contain small amounts of acetic acid which is transformed into vinyl acetate in the vinylation reaction. It is a further advantage of the process of the invention that the presence of vinyl acetate in the crude condensates does not necessitate a change of the working up method. As entrainer for the water in the first distilling column vinyl acetate is then used instead of the vinyl ester of the higher carboxylic acid and when the phases are separated it can be removed from the organic phase.

The accompanying drawing illustrates by way of example a device suitable for carrying out the process of the invention. The mode of operation is described in the following Example 1. Examples 1 and 2 serve to illustrate the invention but they are not intended to limit it thereto.

EXAMPLE 1

The crude mixture used contained 72.0% of acetic acid, 21.0% of vinyl acetate, 5.6% of water, 0.1% of ethyl acetate, 0.1% of acetaldehyde and several unknown components the sum of which amounted to 0.2%.

80 liters per hour of the crude mixture were passed, via a preheater not shown in the drawing, and conduit 1 into the first distilling column A. Inlet 1 was arranged approximately in the centre of the column. Column A had a length of 10 meters and a diameter of 225 millimeters. It was packed with saddles having a diameter of 15 millimeters. The cooling water temperature of the condenser of column A not shown was maintained at 40° C. The temperature at the head of column A amounted to about 64 to 66° C., the sump temperature was about 105° C. with a differential pressure in the column of about 300 millimeters of water column. The distillate withdrawn at the head of column A was passed through conduit 2 to phase separator C in which an organic and an aqueous phase separated. The organic phase was recycled into the column reflux through conduit 3 without measuring its volume. It consisted of vinyl acetate containing 1% of water, 0.1% of acetic and 0.4% of acetaldehyde in addition to traces of ethyl acetate and small amounts of unknown components. The aqueous phase was drawn off through conduit 4 in an amount of 4.7 liters per hour. It contained 0.1% of acetic acid, about 1% of acetaldehyde and about 2.3% of vinyl acetate. In a brine cooler operated at −20° C., not shown in the drawing, and connected at the outlet side of the column condenser about 60 grams per hour of a condensate were obtained containing about 15% of vinyl acetate in addition to acetaldehyde.

From the sump of the first distilling column A about 75 liters of liquid were withdrawn per hour through conduit 5 and introduced into the second distilling column B. The mixture pumped into column B contained 77.5% of acetic acid, 22.5% of vinyl acetate, 0.1% of ethyl acetate, about 0.2% of polymeric vinyl acetate and unknown components. Column B had a length of 20 meters. Inlet 6 of conduit 5 was installed 7.50 meters above the lower end of column B. Below inlet 6 the column had a diameter of 250 millimeters, above the inlet up to the head of the column the diameter was 150 millimeters. Column B was packed with saddles having a diameter of 15 millimeters. With a reflux ratio of 1:3, 16 liters of vinyl acetate distilled off per hour at the head of the column and were withdrawn through conduit 7. The temperature at the head was 72 to 73° C. The distilled vinyl acetate contained as impurities less than 0.02% of acetaldehyde, less than 0.01% of acetic acid, about 0.1% of ethyl acetate, less than 0.03% of water and up to 0.1% of unknown constituents. With a differential pressure of 450 millimeters of water column the temperature in the column amounted to 120 to 122° C. at a height 2.50 meters above the sump. The sump temperature may rise to about 130° C. before the polymer must be drawn off. Through a side conduit 8 about 0.5 meter above the sump of the column gaseous acetic acid was drawn off and condensed in a condenser not shown in the drawing. 57 liters of acetic acid were obtained per hour having a melting point above 14° C. Over the greater part of column B distributed in distances of one meter each outlet valves 9 were arranged to take samples. When the content of ethyl acetate in the pure vinyl acetate rose to more than 0.1%, condensate was withdrawn through said outlet valves 9, preferably approximately at the height of inlet 6 or a little below. The withdrawn condensate contained, in addition to acetic acid and a small amount of vinyl acetate, up to 50% of ethyl acetate.

EXAMPLE 2

The device used was the same as in Example 1. The cooling water of column A had a temperature of 10 to 15° C. The mixture used consisted of 77.6% of isobutyric acid, 18.5% of vinyl isobutyrate, 3.5% of water, 0.1% of ethyl-isobutyrate, 0.05% of acetaldehyde and 0.2% of unknown components, possibly containing n-butyric acid derivatives.

70 liters of the mixture were introduced per hour into column A. The temperature at the head amounted to about 82° C., the sump temperature was 148° C. with a differential pressure in the column of 350 millimeters of water column. The water withdrawn from the phase separator contained up to 1.0% of isobutyric acid and about 0.3% of acetaldehyde. The organic reflux generally contained less than 2% of isobutyric acid and about 0.2% of acetaldehyde. The sump product contained less than 0.01% of acetaldehyde and at most 0.02% of water.

The vinyl isobutyrate distilling off at the head of column B had a purity of at least 99.8%. It contained as impurities up to 0.15% of ethyl isobutyrate and 0.05% of water. The temperature at the head amounted to 104.5 to 105° C. Until the polymer was discharged the temperature of the sump was raised from initially 158° C. to about 170° C. The temperature in the column was 156° C. at a height 2.50 meters above the sump. The isobutyric acid withdrawn through the side outlet had a purity of 99.5%. If the content of ethylisobutyrate in the pure vinyl isobutyrate exceeded 0.2%, ethylisobutyrate was withdrawn from column B discontinuously through the sampling valves advantageously approximately 3 meters below the inlet into the column.

What is claimed is:

1. A process for the continuous recovery of vinyl esters and carboxylic acids from crude mixtures obtained in the vinylation of carboxylic acids with ethylene and oxygen, which mixtures contain the vinyl ester, unreacted carboxylic acid, water and other byproducts, which comprises: distilling said crude mixture in a first distillation zone in the presence of a substance which forms an azeotrope with water; removing an overhead product from said first distillation zone comprising the water in said mixture, said azeotrope forming substance and by-products having a lower boiling point than said vinyl ester; separating said water and by-products from said azeotrope forming substance; recycling all of said substance to said first distillation zone; withdrawing from the sump of said first distillation zone a practically anhydrous mixture; distilling said anhydrous mixture in a second distillation zone and removing therefrom the vinyl ester as an over-head product, at least the major portion of the by-products having a boiling point higher than that of the vinyl ester from at least one concentrating zone between the head and the sump thereof and the carboxylic acid and remaining by-products from the sump of said second distillation zone.

2. The process of claim 1, wherein the vinyl ester is the vinyl ester of an aliphatic carboxylic acid with 2 to 5 carbon atoms.

3. The process of claim 1, wherein the vinyl ester is vinyl acetate.

4. The process of claim 1, wherein the crude mixture introduced into the first distillation zone is obtained by vinylation of a carboxylic acid with ethylene and oxygen in the gaseous phase and in the presence of a noble metal or a salt or an oxide thereof.

5. The process of claim 1, wherein as substance forming an azeotrope with water in the first distillation zone at least one liquid is used which is inert under the reaction conditions and form an azeotrope with water the boiling point of which is lower than that of the vinyl ester obtained.

6. The process of claim 1, wherein the vinyl ester contained in the mixture is used as substance forming an azeotrope with water.

7. The process of claim 1, wherein atmospheric pressure prevails in the first and in the second distillation zone.

8. The process of claim 1 wherein said first distillation zone is maintained at an elevated pressure up to 3 atmospheres gauge.

References Cited

UNITED STATES PATENTS

| 2,997,495 | 8/1961 | Rutledge et al. | 260—499 |
| 3,052,610 | 9/1962 | Akaboshi et al. | 203—16 |
| 3,113,851 | 12/1963 | Fuketa et al. | 203—60 |
| 3,277,158 | 10/1966 | Schaeffer | 260—497 |
| 3,290,362 | 12/1966 | Schaeffer | 260—497 |
| 3,346,626 | 10/1967 | Schaeffer et al. | 260—497 |

WILBUR L. BASCOMB, Jr., *Primary Examiner.*

U.S. Cl. X.R.

203—14, 15, 16, 63, 68, 69, 70, 71, 80, 99; 260—497, 499